Patented Apr. 11, 1939

2,153,615

UNITED STATES PATENT OFFICE 2,153,615

1-ARYL-5-PYRAZOLONE-3-CARBOXYLIC ACIDS

Miles Augustinus Dahlen, Wilmington, Del., and Martin Edwin Friedrich, Carney's Point, N. J., assignors to E. I. du Pont de Nemours & Company, Wilmington, Del., a corporation of Delaware No Drawing. Application October 23, 1936, Serial No. 107,148

6 Claims. (Cl. 260—310)

This invention relates to the manufacture of organic compounds. More particularly, it relates to an improved method for the manufacture of the 1 - aryl - 5 - pyrazolone-3-carboxylic - acids which have a structure represented by the following general formula:

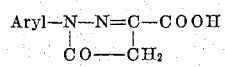

in which formula "aryl" represents an aromatic group.

The method heretofore used for the preparation of these compounds consists in the following steps:

1. An aryl-hydrazine is condensed in water or a solvent with oxal-acetic-ester to form the hydrazone:

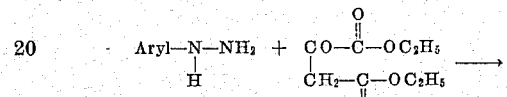

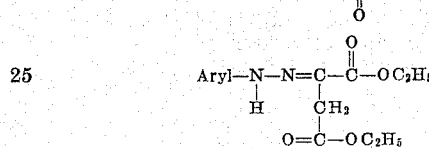

2. The hydrazone is heated in a slightly alkaline solution at temperatures above about 70° to about 100° C. to form the ethyl ester of 1-aryl-5-pyrazolone-3-carboxylic-acid:

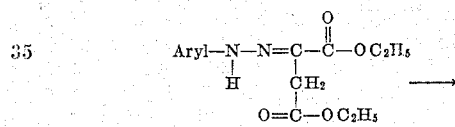

3. The ester group is hydrolyzed at above about 70° C. to about 100° in a strongly alkaline solution to form the aryl-pyrazolone-carboxylic-acid shown in the above formula:

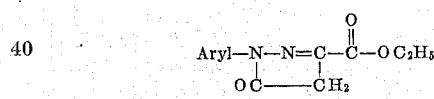

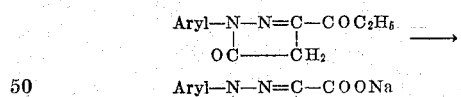

The aryl group may consist of phenyl, tolyl, naphthyl, and solubilized derivatives, such as the nitro, chloro and sulfo derivatives.

The reactions described above are usually run without difficulty, when the solubilized or sulfonated hydrazines are used in making the hydrazones, whereupon the pyrazolones then are soluble. However, on using an unsulfonated hydrazine or one which does not contain a solubilizing group, a water-insoluble hydrazone is obtained, usually in a poor physical form. Since it has a relatively low melting point, the hydrazone first precipitates as an oil which later hardens into agglomerates consisting of a mixture of the hydrazone and unreacted hydrazine. In the next step, the pyrazolone is formed along with a large percentage of tarry materials. The purification of this mixture is very difficult, since the by-products have properties similar to the pyrazolone. Heretofore attempts have been made to prepare the hydrazone in a better physical form. For example, in accordance with the French Patent 307,424, the hydrazine salt and sodium-oxalacetate was heated in a water immiscible solvent, the solvent was removed by steam distillation and the finely divided precipitate of the hydrazone was converted into the pyrazolone in accordance with the above reaction. However, this process is not entirely satisfactory, and it is desirable to provide improved processes for the preparation of the above named acids.

It is an object of this invention to provide improved methods for preparing the 1-aryl-5-pyrazolone-3-carboxylic-acids. A further object is the preparation of the unsulfonated 1-aryl-5-pyrazolone-3-carboxylic-acids in better yield and improved quality. Another object is to provide improved methods for the preparation of the 1-aryl-5-pyrazolone-3-carboxylic-acids by reacting suitable compounds with an aryl-hydrazine at relatively low temperatures. Another object of the invention is to provide improved methods of preparing the 1-aryl-5-pyrazolone-3-carboxylic-acids by reacting suitable compounds with an aryl-hydrazine which is free from solubilizing groups. Another object of the invention is to provide for preparing the 1-aryl-5-pyrazolone-3-carboxylic-acids which are free from solubilizing groups in the aryl-hydrazine residue. Still other objects of the invention will be apparent from the following description thereof.

It has been found that improved results in the manufacture of the 1-aryl-5-pyrazolone-3-carboxylic-acids may be obtained by the following procedure:

1. An alkyl ester of an alkyl-metallo-oxalcarboxylic acid, such as sodium-di-ethyl-oxalacetate is hydrolyzed to the mono-ester, such as the sodium-mono-ethyl-metallo-oxal-acetate by the action of an alkali.

2. The mono-alkyl-metallo-oxal-ester is condensed at a low temperature in slightly acid aqueous solution with an aryl-hydrazine, producing the alkali salt of the hydrazone.

3. Without isolation, the hydrazone is converted to the pyrazolone salt by rendering the reaction mass alkaline and thereafter this sodium salt of the pyrazolone is converted to the acid and precipitated by acidification.

An exemplification of the above reactions is shown by the following equations, but it is to be understood that the equations do not necessarily present the exact or entire mechanism of the reaction, and the invention is not restricted to this representation.

1. Preparation of sodium mono-ethyl-oxal-acetate:

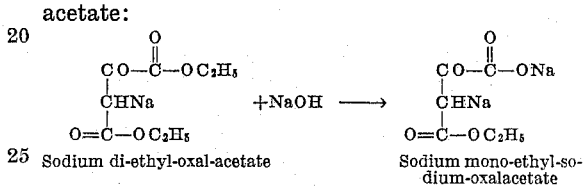

Sodium di-ethyl-oxal-acetate     Sodium mono-ethyl-sodium-oxalacetate

2. Preparation of hydrazone-carboxlic-acid:

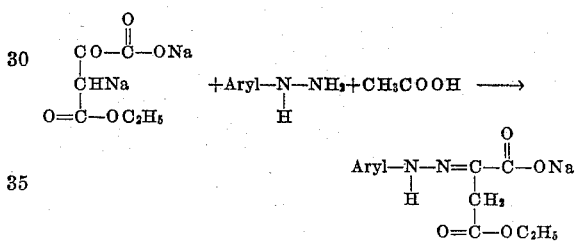

Sodium salt of the hydrazone-carboxylic acid

3. Preparation of sodium salt of pyrazolone-carboxylic-acid:

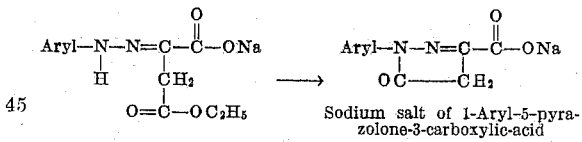

Sodium salt of 1-Aryl-5-pyrazolone-3-carboxylic-acid

4. The sodium salt is converted to the corresponding acid by acidificaiton.

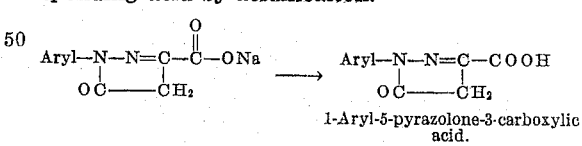

1-Aryl-5-pyrazolone-3-carboxylic acid.

The first two steps of the above process are discussed in the literature, but as far as we are aware the combination with the third step, or ring-closure was unknown heretofore.

This invention will be understood more fully by reference to the following examples, in which all quantities are stated in parts by weight, but it is to be understood that the invention is not limited to the examples.

*Example I*

21.9 parts of sodium-di-ethyl-oxal-acetate having a molecular weight of 220 and purity of 95.6%, were agitated in 100 parts of water at 40° C. The solid dissolved slowly. An equivalent amount of sodium-hydroxide, in solution as a 30% by weight solution, to convert the ester to the ethyl-sodium ester was added at such a rate that the solution remained just alkaline to Clayton yellow papers. The temperature was held at 40-45° C. The solution of the sodium salt of the mono-ethyl-ester of oxal-acetic-acid then was acidified to litmus, at 35-40° C. by the addition of glacial acetic-acid.

14.5 parts of phenyl-hydrazine-hydrochloride were dissolved in 100 parts of water at 60° C. This solution was added at 40-45° C. to the solution of the mono-ethyl-oxal-acetate, during a period of about 15 minutes. A light cream colored precipitate of the mono-sodium salt of the hydrazone formed immediately. When a small sample of the hydrazone was recrystallized from dilute alcohol, it melted at about 140° C., and immediately resolidified. On further heating, it melted at 240-241° C.

The main portion of the reaction mass was agitated about 15 minutes at 35-40° C. About 20 cc. of 30% sodium-hydroxide then were added at 38-43° C., keeping the solution just alkaline to brilliant yellow papers. The precipitate of the hydrazone dissolved immediately. The solution was agitated about 10 minutes at 45-50° C., to clarify the same, and the 1-phenyl-5-pyrazolone-3-carboxylic-acid was formed and precipitated by the addition of hydrochloric acid. The pyrazolone was isolated by filtration and dried. The yield was about 90% of the theoretical. The product melted at 253.5-254.4° C. and upon analysis was found to be 96.7% pure. The product is represented by the following formula:

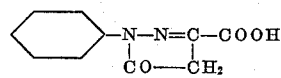

*Example II*

One-tenth mol of m-nitro-phenyl-hydrazine-hydrochloride was dissolved in 200 parts of water at 60° C., and the solution cooled to 30° C. It was added, at 30-35° C. during a period of about 5 minutes to a solution of sodium-mono-ethyl-sodium-oxal-acetate prepared in the following manner:

22.6 parts of sodium-oxal-acetate having a molecular weight of 188 and purity, 87.4%, were dissolved in 200 parts of water at 50° C. 15.0 parts of sodium-hydroxide solution (30%) were added at 45-50° C. at such a rate that the solution remained alkaline to Clayton yellow papers. Glacial acetic-acid then was added until the mixture was acid to litmus paper, and the solution was cooled to 30° C. Upon adding the solution of m-nitro-phenyl-hydrazine-hydrochloride a bright yellow precipitate of the hydrazone was precipitated. The melting point of the hydrazone is 196-197° C. The charge was agitated about 10 minutes at 30-35° C., and sodium-hydroxide added at 30-35° C. as a 30% solution, until the solution was alkaline to Clayton yellow papers. The precipitate of the hydrazone dissolved as the alkali was added. The solution was held at 35-40° C. for about 15 minutes, then clarified. The pyrazolone acid was precipitated on the addition of hydrochloric-acid. The product melted at 247-248° C. The yield was almost quantitative. Upon recrystallization from water as the sodium salt, the product melts at 263-264° C. The product is represented by the following formula:

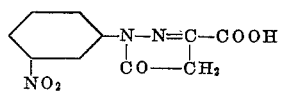

*Example III*

Two-tenths mol of di-ethyl-sodium-oxal-acetate was agitated at 40° C. with 200 parts of water. An equivalent amount of sodium-hydroxide to form the sodium-ethyl ester was then added at 35–45° C. as a 30% solution, at such a rate that the solution remained alkaline to Clayton yellow papers. The sodium-oxal-acetate dissolved gradually. Glacial-acetic-acid was added to the solution of the mono-ethyl-oxal-acetate at 30–35° C. until it was acid to litmus.

94 parts of p-sulfo-phenyl-hydrazine having a molecular weight of 188 and purity of 40% were suspended in 250 parts of water. Sodium-acetate was added to the solution until it was no longer acid to Congo red papers. This suspension was added to the solution of oxal-acetate obtained above at 30–35° C. during a period of about 10 minutes. The solution was heated for about 15 minutes at 35–40° C. and a 30% solution of sodium-hydroxide added at 40–45° C. until the mixture was alkaline to brilliant yellow papers. It was agitated for about 15 minutes at 40–45° C. and clarified. The charge was acidified by the addition of hydrochloric-acid at 40–45° C., and cooled to 5–10° C. An almost white precipitate of the 1-(p-sulfo-phenyl)-5-pyrazolone-3-carboxylic-acid represented by the following formula was formed. The yield was about 85% of the theoretical. The product is represented by the following formula:

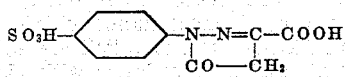

*Example IV*

43.7 parts of sodium-oxal-acetate having a molecular weight of 188 and purity of 86% were dissolved in 200 parts of water at 50–55° C. The solution was cooled to 40° C. and 30 parts of sodium-hydroxide as a 30% solution were added at 40–45° C., at such a rate that the solution remained alkaline to Clayton yellow papers. The solution was acidified to litmus, by the addition of 13 parts of glacial acetic-acid, at 35–40° C.

147.4 parts of 3-sulfo-6-chloro-phenyl-hydrazine having a purity of 33.2% and molecular weight of 222.5 were suspended in 500 parts of water at 50–55° C. This suspension was added to the solution of mono-ethyl-oxal-acetate obtained above, during a period of 5–10 minutes at 40–45° C. The charge was agitated about 15 minutes at 40–45° C., and then was made neutral to Congo red papers, by the addition of sodium-hydroxide and sodium-acetate. It was agitated about 15 minutes at 40° C. and made alkaline to brilliant yellow papers by the addition of about 80 parts of sodium-hydroxide solution (30%). The resulting solution was a dark red color. It was agitated for an hour at 60–69° C., and clarified. Hydrochloric-acid was added until the solution was acid to Congo red papers. It was cooled to room temperature and saturated with salt. The precipitate was filtered and dried at 95° C. 72 parts of 1-(3'-sulfo-6'-chlor-phenyl)-5-pyrazolone-3-carboxylic-acid having a purity of 64% were obtained. This represented a yield of about 78%. The product is represented by the following formula

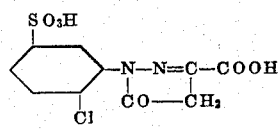

The invention may be utilized for the preparation of a wide range of 1-aryl-5-pyrazolone-3-carboxylic-acids. The aryl group may have one or more than one benzene nuclei, such as phenyl, alpha or beta-naphthyl, anthra-quinonyl and the like. The aryl nucleus may have either solubilizing or non-solubilizing substituents, such as the usual hydrocarbon radicals, for example alkyl, alkoxy, aryl, aralkyl, nitro, halogen, sulfonic-acid, carboxylic-acid, trifluoromethyl, and the like.

Instead of sodium-oxal acetate, free diethyl-oxal-acetate or its metallo organic derivatives, such as potassium-, lithium-, or copper-oxal-acetate, may be used in the first step.

In the hydrolysis of the metallo-diethyl-oxal-acetate to the salt of the mono-ethyl-oxal-acetate, other strong alkalis, such as potassium-hydroxide and sodium carbonate may be used. Other alkyl esters, such as the methyl, isopropyl and normal-butyl-oxal-acetates or mixed esters may be used instead of the ethyl-ester.

In the first step of the process, the temperature of hydrolysis the di-ester of oxal-acetic-acid to the mono-ester may be varied, the limitation being that conditions of hydrolysis shall not be sufficiently drastic and the temperature shall not be so high as to effect substantial hydrolysis of the second ester group. It is preferable that this operation be carried out at relatively low temperatures, say about 35° to about 50° C., and that the product be condensed with the hydrazine promptly, but higher and lower temperatures can be used.

Inter-action of the hydrazine with the mono-ester will take place most rapidly and most completely under faintly acid conditions, for example, as indicated by litmus. It is desirable that this be done under slightly acid conditions in order that ring-closure to the pyrazolone shall not take place until hydrazone formation is complete. For the best results, it is desirable that the temperature be held fairly low in this step, say about 30° to about 45° C. since ring-closure may result even in acid solution if too elevated temperatures are used. However, the higher and lower limits of temperature and the indicated acidity can be exceeded.

According to the above examples, ring-closure of the hydrazone to the pyrazolone is effected with sodium-hydroxide but other soluble alkalis, such as potassium hydroxide, potassium carbonate, sodium carbonate and weak alkalis may be used. It is desirable that this step of the process be carried out at relatively low temperatures in order to avoid side reactions. Temperatures of about 35° to 65° C. are preferred but higher and lower temperatures can be used with varied success. Temperatures above 70° C. are avoided.

The methods of isolating the product must be varied in accordance with the nature of the material, particularly its solubility characteristics. Acids sufficient to displace the sodium group with a carboxyl group are used. Mineral acids are suitable because of their low cost but other acids can be used.

Wislicenus, in Annalen 246 323, discloses steps 1 and 2 of the above process, but he found that it was necessary to isolate the hydrazone and convert it to the pyrazolone by heating at 140° C. The present process is an improvement over the methods of Wislicenus in that the step of isolating the intermediate is avoided, thereby avoiding the usual losses in isolation. In accordance with the invention, it is found that the conversion to pyrazolone is accompanied by less side reaction at the lower temperatures used in the processes. As a consequence, the yields and quality of products are improved in the present method. The prior art also discloses condensation of diethyl-oxal-acetate with an aryl hydrazine to a hydrazone, followed by ring-closure to the ester of the aryl-pyrazolone-carboxylic-acid. This ester is hydrolyzed to the pyrazolone-carboxylic-acid. This procedure gives fairly good results, provided that the aryl-hydrazine contains solubilizing substituents such as sulfonic-acid or carboxylic-acid groups. However, when such substituents are not present, side reactions occur to an important degree, resulting in low yields of products and the products are contaminated with various impurities.

It is in the preparation of the pyrazolones containing no solubilizing groups in the aryl nucleus that the present processes are preferred and in the preparation of which they are by far the most advantageous over the methods of the prior art.

The pyrazolone-carboxylic-acids are important intermediates in the manufacture of azo dyes. For example, 1-(3'-amino-phenyl)-5-pyrazolone-3-carboxylic-acid is used in the preparation of an azo dyestuff having a yellow color. This dyestuff is obtained by reducing the product of Example II with a reducing agent, such as iron sulphide, whereby the nitro group of the compound is reduced to an amino group.

As many widely different embodiments of the invention will be apparent to those skilled in the art without departure from the spirit and scope of the described invention, it is to be understood that no limitations are intended in the annexed claims except those which are specifically recited or are imposed by the prior art.

We claim:

1. The process of manufacturing 1-(3'-amino-phenyl)-5-pyrazolone-3-carboxylic-acid which comprises condensing m-nitro-phenyl-hydrazine-hydrochloride with an alkali metal salt of mono-ethyl-oxal-acetate which is represented by the formula

in which A is an alkali metal, at temperatures which are insufficient to effect substantial formation of a pyrazolone and in a medium slightly acidified with an organic acid which is insufficient to convert said fixed alkali to a carboxyl group until a hydrazone salt is formed, heating the product of condensation at temperatures of about 35° to about 40° C. in a solution which is maintained alkaline to brilliant yellow paper by means of a soluble fixed alkali until a fixed alkali salt of 1-(-3'-nitrophenyl)-pyrazolone carboxylic acid is formed, reducing the nitro group and acidifying with an acid sufficient to convert the sodium carboxylic group of said pyrazolone to a carboxyl group.

2. The process which comprises condensing in a slightly acid medium an arylhydrazine acid salt with a compound represented by the formula

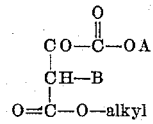

in which A is an alkali metal and B is one of the group consisting of alkali metals and copper, until a hydrazone compound is formed which is represented by the formula

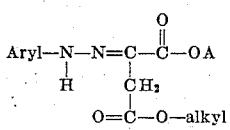

said condensation being carried out at temperatures of about 30° to about 45° C.; and then heating said hydrazone in aqueous slightly alkaline medium at temperatures of about 35° to about 65° C. until an alkali salt of a 1-aryl-5-pyrazolone-3-carboxylic acid is formed.

3. The process in accordance with claim 2, in which A and B are each an alkali metal.

4. The process in accordance with claim 2, in which the arylhydrazine is a phenylhydrazine.

5. The process in accordance with claim 2, in which the arylhydrazine is a phenylhydrazine which is substituted in the aryl nucleus by a member of the group consisting of alkyl, alkoxy, aryl, aralkyl, nitro, halogen and trifluoro-methyl.

6. The process which comprises condensing a nitro-phenyl-hydrazine hydrochloride with a compound represented by the formula.

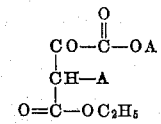

in which A is an alkali metal, in a medium which is slightly acid with acetic acid and at temperatures of about 30° to about 45° C. until an alkali salt of nitro-phenyl-hydrazone-carboxylic acid is formed; and then heating said hydrazone in aqueous slightly alkaline medium at temperatures of about 35° to about 65° C. until an alkali salt of 1-(nitro-phenyl)-5-pyrazolone-carboxylic acid is formed.

MILES AUGUSTINUS DAHLEN.
MARTIN EDWIN FRIEDRICH.